(12) United States Patent
Fischer et al.

(10) Patent No.: US 8,764,055 B2
(45) Date of Patent: Jul. 1, 2014

(54) AIR BAG WITH PLEATED PORTION

(75) Inventors: Kurt F. Fischer, Leonard, MI (US);
Douglas M. Gould, Lake Orion, MI (US); Patrick R. Landis, Washington, MI (US); Paul M. Lange, Dryden, MI (US)

(73) Assignee: TRW Vehicle Safety Systems Inc., Washington, DC (US)

( * ) Notice: Subject to any disclaimer, the term of this patent is extended or adjusted under 35 U.S.C. 154(b) by 0 days.

(21) Appl. No.: 13/337,381

(22) Filed: Dec. 27, 2011

(65) Prior Publication Data

US 2013/0056963 A1 Mar. 7, 2013

Related U.S. Application Data

(60) Provisional application No. 61/530,707, filed on Sep. 2, 2011.

(51) Int. Cl.
*B60R 21/231* (2011.01)

(52) U.S. Cl.
USPC .......................................... 280/743.1; 280/739

(58) Field of Classification Search
USPC .................................. 280/743.1, 728.1, 732
See application file for complete search history.

(56) References Cited

U.S. PATENT DOCUMENTS

| | | | | |
|---|---|---|---|---|
| 3,810,654 A * | 5/1974 | DeBano et al. | ............ | 280/728.1 |
| 4,010,055 A * | 3/1977 | Oka et al. | ...................... | 156/226 |
| 4,944,529 A * | 7/1990 | Backhaus | .................. | 280/743.1 |
| 5,048,863 A * | 9/1991 | Henseler et al. | ........... | 280/743.1 |
| 5,087,071 A * | 2/1992 | Wallner et al. | ............. | 280/743.1 |
| 5,312,132 A * | 5/1994 | Pillet | ......................... | 280/743.1 |
| 5,445,414 A * | 8/1995 | Pittman et al. | ............. | 280/743.1 |
| 5,454,595 A * | 10/1995 | Olson et al. | ................ | 280/743.1 |
| 5,482,318 A * | 1/1996 | Sollars, Jr. | .................. | 280/743.1 |
| 5,653,464 A * | 8/1997 | Breed et al. | ................ | 280/743.1 |
| 5,697,640 A * | 12/1997 | Lalonde | ...................... | 280/743.1 |
| 5,863,068 A * | 1/1999 | Breed | ......................... | 280/743.1 |
| 5,975,564 A * | 11/1999 | Smith et al. | ................... | 280/729 |
| 6,355,123 B1 * | 3/2002 | Baker et al. | ...................... | 156/90 |
| 6,435,553 B1 * | 8/2002 | Wipasuramonton et al. | ........................... | 280/743.1 |
| 6,517,109 B1 * | 2/2003 | Van Poppel | ................ | 280/743.1 |
| 7,125,044 B2 * | 10/2006 | Nishijima et al. | ......... | 280/743.1 |
| 7,185,913 B2 * | 3/2007 | Bakhsh et al. | ............. | 280/730.1 |
| 7,207,594 B2 * | 4/2007 | Igawa et al. | ................ | 280/730.1 |
| 7,513,523 B2 * | 4/2009 | Bayley et al. | ............. | 280/730.2 |
| 7,625,008 B2 * | 12/2009 | Pang et al. | .................. | 280/743.1 |
| 7,654,561 B2 | 2/2010 | Webber et al. | | |
| 7,731,230 B2 * | 6/2010 | Fischer et al. | ................ | 280/732 |
| 7,938,445 B2 | 5/2011 | Smith et al. | | |
| 7,946,613 B2 | 5/2011 | Rose et al. | | |
| 7,980,592 B2 * | 7/2011 | Fischer et al. | ............. | 280/743.1 |

(Continued)

*Primary Examiner* — Nicole Verley
(74) *Attorney, Agent, or Firm* — Tarolli, Sundheim, Covell & Tummino LLP

(57) ABSTRACT

An inflatable vehicle occupant protection device (14) includes at least one panel (212) of material that defines an inflatable volume (54) of the protection device. The at least one panel (212) has a portion presented toward the vehicle occupant when in an inflated and deployed condition. The protection device (14) includes at least one pleat (296, 316) formed in the at least one panel (212). The at least one pleat (296, 316) defines a cushioned portion (210) for receiving a portion of the occupant. The at least one pleat (296, 316) reduces fabric tension in the cushioned portion (210) to provide the cushioned portion with a degree of softness that is reduced over remaining areas of the protection device (14).

18 Claims, 6 Drawing Sheets

(56) References Cited

U.S. PATENT DOCUMENTS

| | | |
|---|---|---|
| 7,992,892 B2 * | 8/2011 | Jaramillo ................ 280/729 |
| 8,042,831 B2 * | 10/2011 | Hoffman et al. .......... 280/730.1 |
| 8,118,325 B2 * | 2/2012 | Enders et al. ............. 280/730.1 |
| 8,186,713 B2 * | 5/2012 | Fischer et al. ............. 280/739 |
| 2006/0028009 A1 * | 2/2006 | Hasebe et al. ............. 280/743.1 |
| 2006/0273562 A1 * | 12/2006 | Fischer et al. ............. 280/739 |

\* cited by examiner

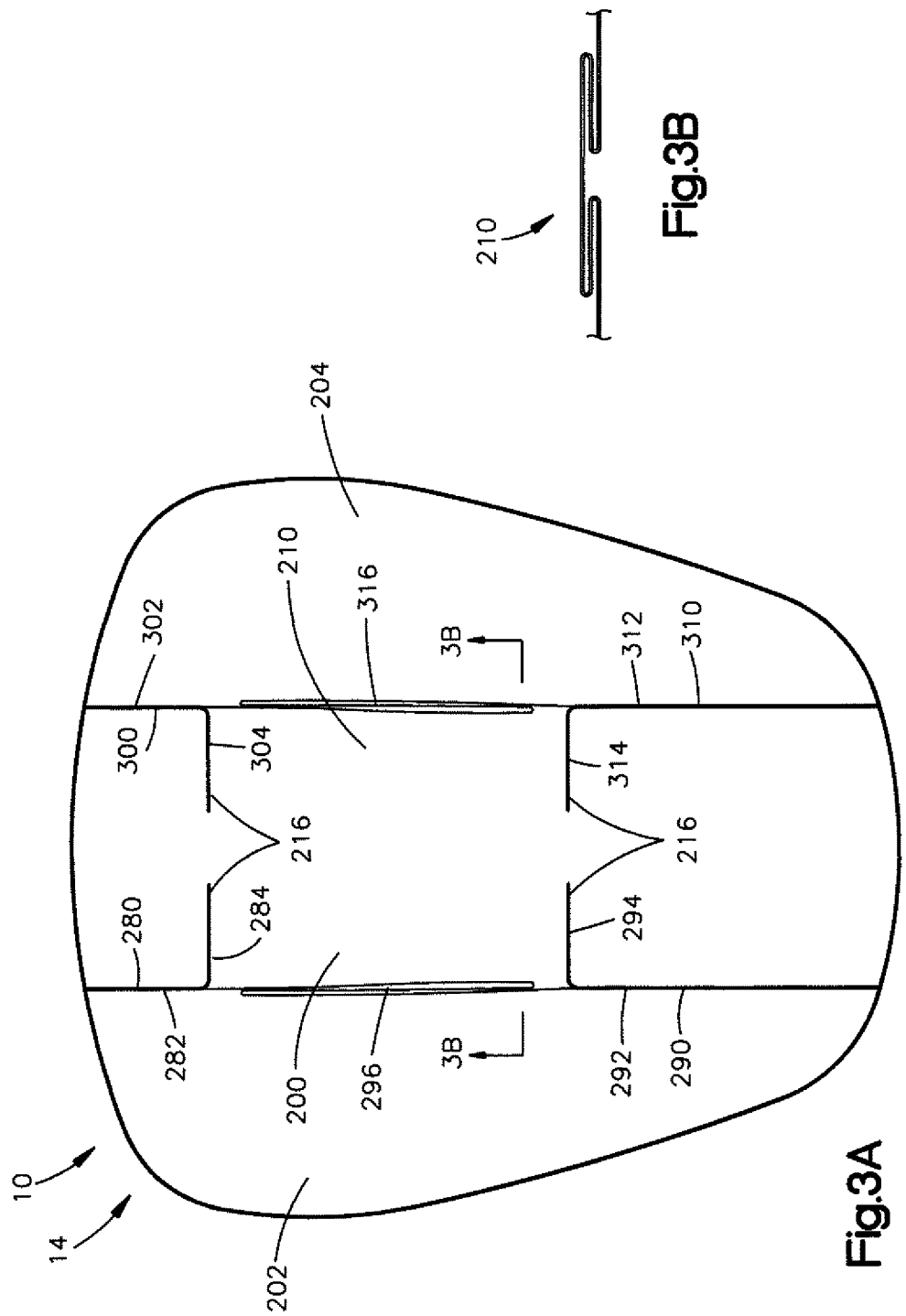

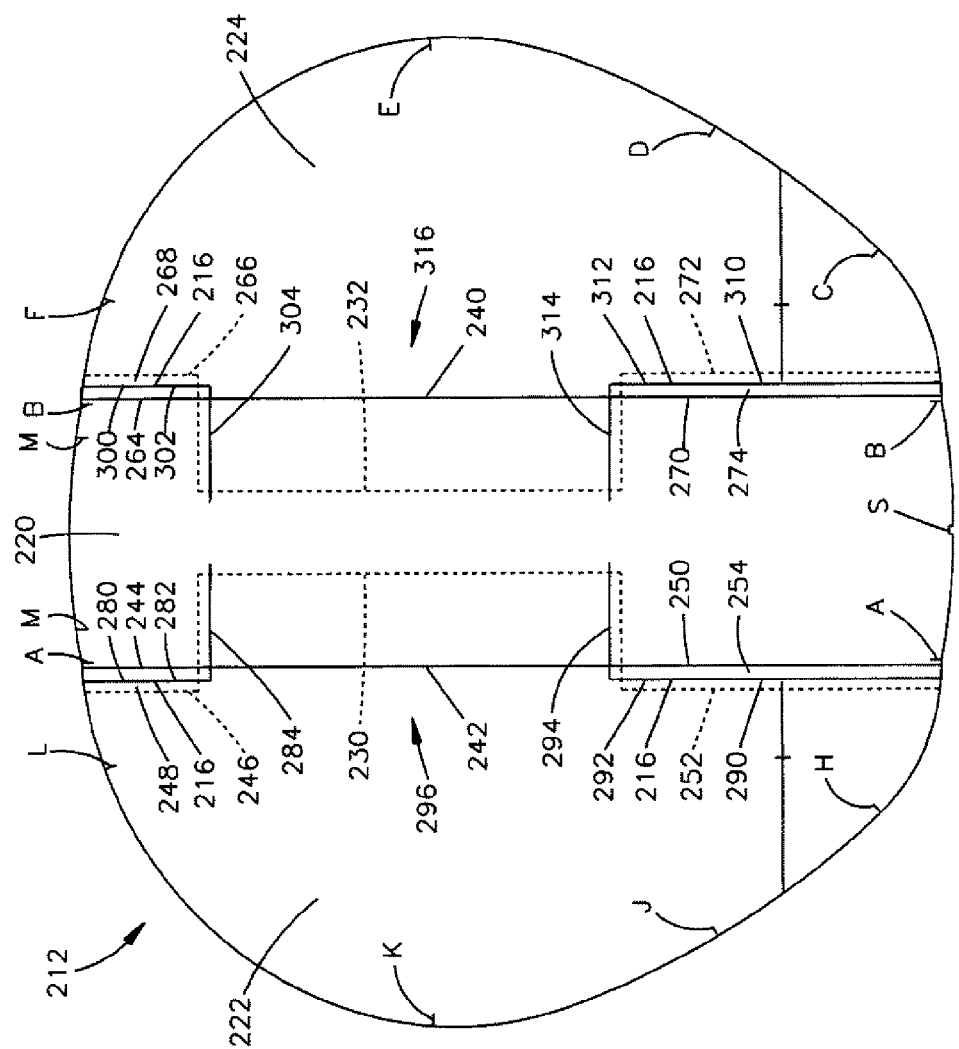

US 8,764,055 B2

AIR BAG WITH PLEATED PORTION

RELATED APPLICATIONS

This application claims the benefit of U.S. Provisional Application Ser. No. 61/530,707, filed Sep. 2, 2011.

FIELD OF THE INVENTION

The present invention relates to an apparatus for helping to protect an occupant of a vehicle. More particularly, the present invention relates to an air bag inflatable between a portion of a vehicle and a vehicle occupant. In one embodiment, the present invention relates to an air bag inflatable between an instrument panel and a front seat vehicle occupant.

BACKGROUND OF THE INVENTION

It is known to provide an inflatable vehicle occupant protection device, such as an air bag, for helping to protect an occupant of a vehicle. Air bags are inflatable between a portion of the vehicle and a vehicle occupant. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an inflatable vehicle occupant protection device that includes at least one panel of material that defines an inflatable volume of the protection device. The at least one panel has a portion presented toward the vehicle occupant when in an inflated and deployed condition. The protection device includes at least one pleat formed in the at least one panel. The at least one pleat defines a cushioned portion for receiving a portion of the occupant. The at least one pleat reduces fabric tension in the cushioned portion to provide the cushioned portion with a degree of softness that is reduced over remaining areas of the protection device.

The present invention also relates to an inflatable vehicle occupant protection device that includes at least one panel of material that defines an inflatable volume of the protection device. The at least one panel has a portion presented toward the vehicle occupant when in an inflated and deployed condition. At least one pair of cutout portions extend toward each other from opposite edges of the at least one panel. At least one pleat portion of the at least one panel is defined between the cutout portions. The at least one panel is folded over in a Z-fold configuration in the area of the at least one pleat portion to position the at least one pleat portion between overlying portions of the at least one panel. Interconnections interconnect the overlying portions of the at least one panel with each other and with the at least one pleat portion positioned between to form at least one pleat that helps define a cushioned portion of the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3a is a front view of the pleated air bag of FIG. 2;

FIG. 3b is a sectional view taken generally along line 3b-3b in FIG. 3a;

FIG. 4b is a plan view illustrating an assembled condition of the component part of FIG. 4a;

DETAILED DESCRIPTION OF THE INVENTION

Figure 1:
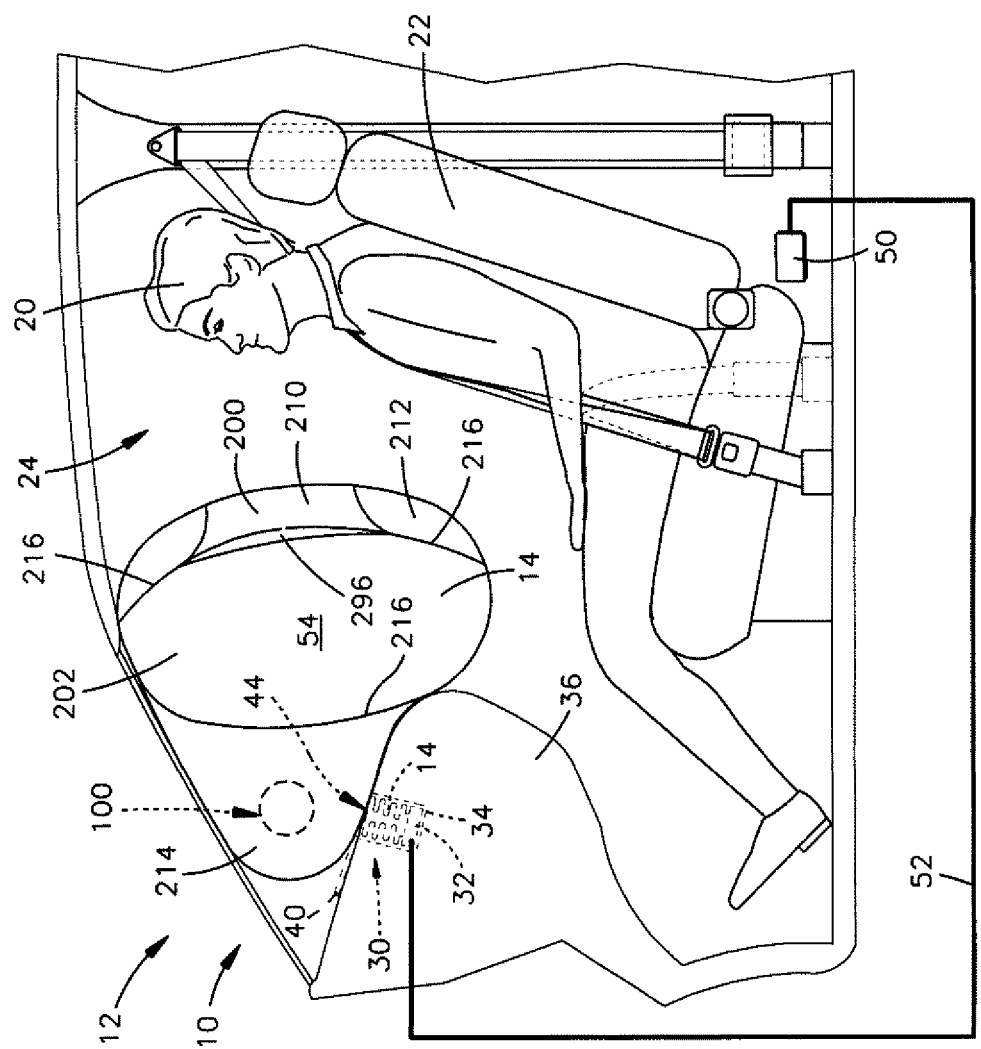
FIG. 1 is a schematic side view illustrating an apparatus for helping to protect an occupant of a vehicle, according to an embodiment of the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12. Those skilled in the art will appreciate that the apparatus 10 disclosed herein could be adapted for a driver side vehicle occupant (not shown) or occupants of rearward rows of the vehicle 12, such as a $2^{nd}$ row, $3^{rd}$ row, etc., of the vehicle (not shown).

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag 14 also includes a vent 100, illustrated schematically, for releasing inflation fluid from the inflatable volume 54 of the air bag 14. The vent 100 may be selectively actuated in order to help control or tailor inflation of the air bag in response to vehicle conditions, occupant conditions, or both. The vent 100 may be actuatable actively, for example, in response to conditions determined via active sensors, or passively, for example, having a configuration responsive to physical conditions at the time of inflation. Alternatively, the vent 100 may be a passive vent that always vents inflation fluid.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

Figure 2:
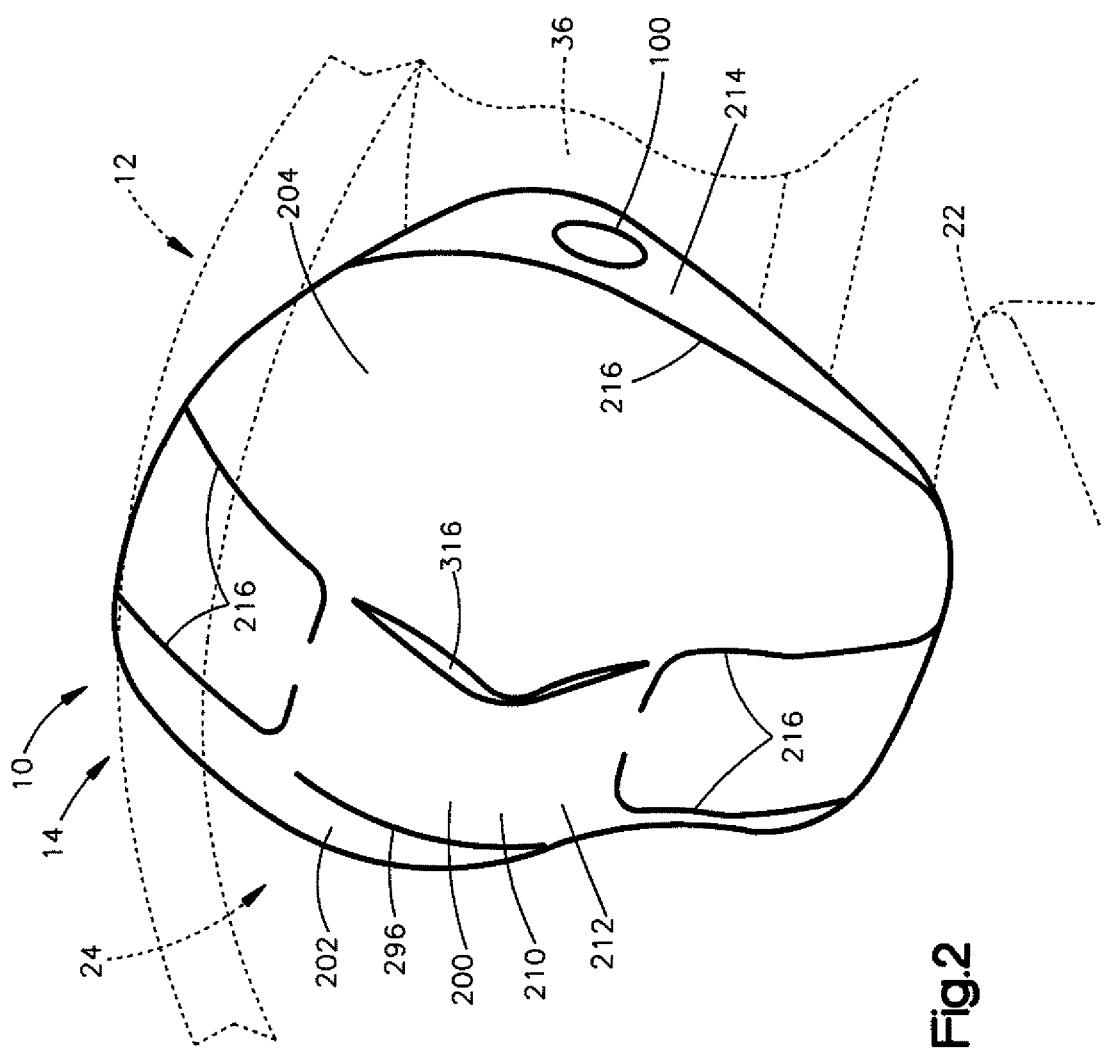
FIG. 2 is a frontal perspective view of a pleated air bag of the apparatus in accordance with the present invention in an inflated condition.

FIGS. 2 and 3 illustrate the air bag 14 from the perspective of the occupant 20 of the vehicle 12 depicted in FIG. 1. Referring to FIGS. 2 and 3, the air bag 14 includes a central portion 200, an inboard lateral portion 202 positioned to the left (i.e., inboard) of the central portion as viewed in FIG. 3, and an outboard lateral portion 204 positioned to the right (i.e., outboard) of the central portion as viewed in FIG. 3. The central portion 200 is adapted to receive certain portions of the occupant 20, such as the head and thorax. According to the present invention, the central portion 200 includes a pleated portion 210 that is configured to receive the head and upper thorax/chest of the occupant 20 (see FIG. 1). The pleated portion 210 is a cushioned portion of the central portion 200 that is constructed to provide an enhanced cushioning effect in comparison to other portions of the air bag 14.

The air bag 14 illustrated in FIGS. 1-3 has a two-panel construction including a front panel 212 and a rear panel 214. The front panel 212 and rear panel 214 are secured to each other by an interconnection 216. In this description, the interconnection 216 is referred to as stitching. Those skilled in the art, however, will appreciate that the interconnection 216 may be formed from any suitable means, such as stitching, an ultrasonic weld, a heat bond, or an adhesive. In the inflated condition of the air bag 14, the front panel 212 is presented facing the occupant 20 and the rear panel 214 is presented facing primarily the windshield and instrument panel of the vehicle 12. The front panel 212 therefore forms the occupant facing portions of the central portion 200, inboard lateral portion 202, and outboard lateral portion 204. The rear panel 214 forms the instrument panel/windshield facing portions of the central portion 200, inboard lateral portion 202, and outboard lateral portion 204.

The two-panel construction of the air bag 14 of the embodiment illustrated in FIGS. 1-5 is exemplary in nature. Those skilled in the art will appreciate that the air bag 14 may have a configuration in which the number of panels used to construct the air bag is greater than two without departing from the spirit and scope of the present invention. For example, the front panel 212, the rear panel 214, or both the front and rear panels could be constructed out of multiple panels that are constructed separately and interconnected by known means, such as stitching or ultrasonic welding, to complete the panel(s).

Additionally, those skilled in the art will appreciate that the overall shape of the air bag 14 may also vary. Factors that may influence varied shapes of the air bag 14 include, for example, the architecture of the vehicle 12, the location in the vehicle (e.g., driver side, passenger side, front seat, rear seat) where the air bag is located, the type of protection afforded by the air bag (e.g., frontal impact, side impact, rollover) and the desired area of occupant coverage. Such variations in the overall shape of the air bag 14 are considered within the scope of the present invention.

Figure 4A:
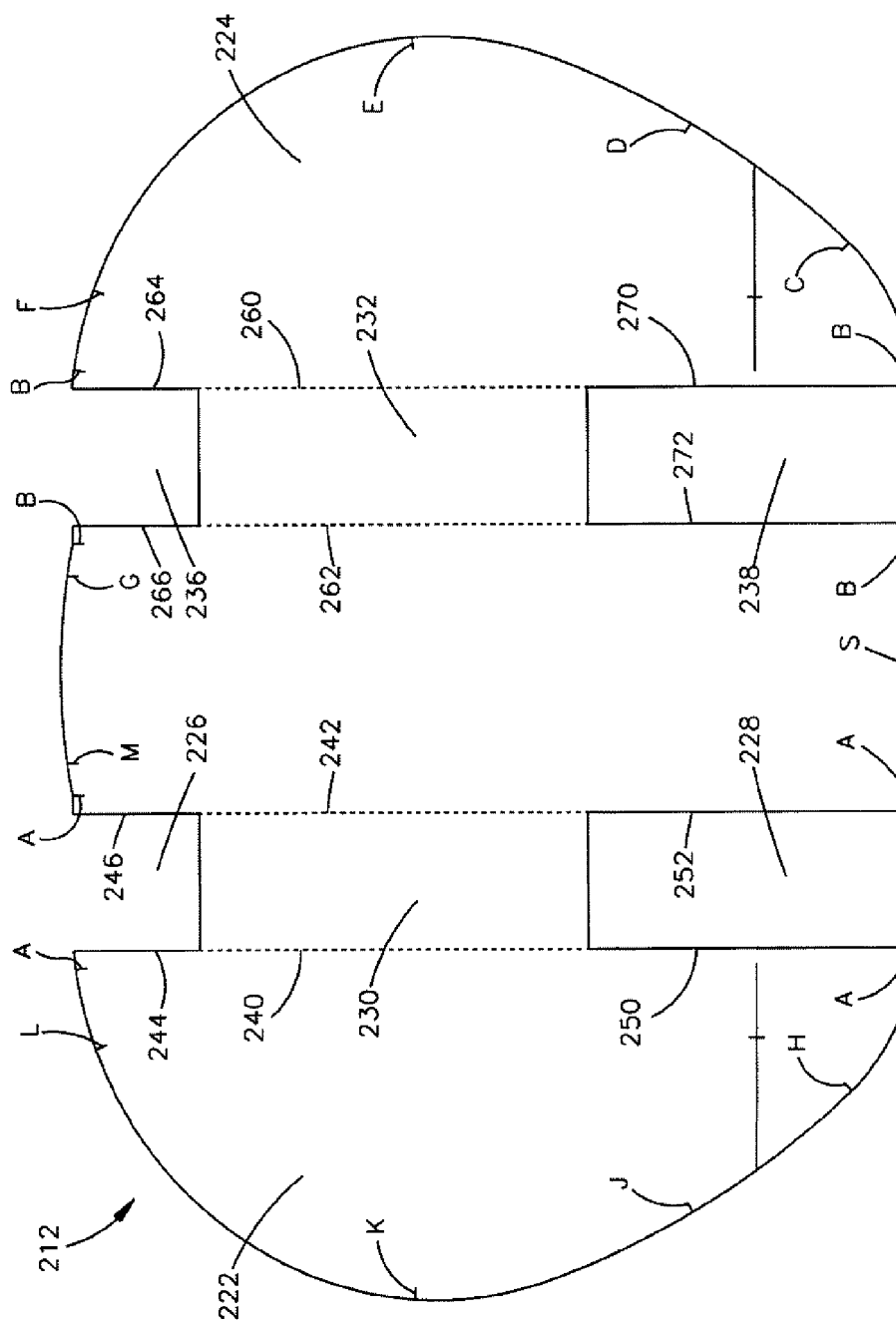
FIG. 4a is a plan view illustrating a first component part of the pleated air bag of FIGS. 1-3.

The front panel 212 is illustrated in FIGS. 4a and 4b. The front panel 212 includes a center panel portion 220, an inboard panel portion 222, and an outboard panel portion 224. An inboard pleat portion 230 extends between and interconnects the inboard panel portion 222 to the center panel portion 220. An outboard pleat portion 232 extends between and interconnects the outboard panel portion 224 to the center panel portion 220. The pleated portions 230 and 232 are defined at least partially by inboard cutout portions 226, 228 and outboard cutout portions 236, and 238 of the front panel 212.

The front panel 212 is folded and has portions interconnected by known means, such as stitching, ultrasonic welding, heat bonding, or adhesives, to form the pleated portion 210 of the central portion 200. The front panel 212, having the pleated portion 210 formed thereon, is placed in a condition for being connected to the rear panel 214 to complete the construction of the air bag 14. FIG. 4b illustrates the front panel 212 in a folded condition, ready for the application of the interconnections that form the pleated portion 210.

Referring to FIG. 4b, to form the pleated portion 210, the inboard panel portion 222 and inboard pleat portion 230 are folded along fold lines 240 and 242 to form a Z-fold that places the inboard panel portion in the position relative to the center panel portion 220 shown in FIG. 4b. The front panel 212 may include alignment marks to assist in proper alignment of the panel portions. Referring to FIG. 4a, alignment marks labeled "A" are aligned with each other to place the inboard panel portion 222 and the center panel portion 220 in the positions shown in FIG. 4b. This positions an upper edge portion 244 of the inboard panel portion 222 overlying an upper edge portion 246 of the center panel 220, thus creating an overlap 248 where the interconnection 216 (stitching, etc.) between the inboard panel portion and center panel portion can be formed. This also positions a lower edge portion 250 of the inboard panel portion 222 overlying a lower edge portion 252 of the center panel 220, thus creating an overlap 254 where the interconnection 216 between the inboard panel portion and center panel portion can be formed.

Similarly, to form the pleated portion 210, the outboard panel portion 224 and outboard pleat portion 232 are folded along fold lines 260 and 262 to form a Z-fold that places the outboard panel portion in the position relative to the center panel portion 220 shown in FIG. 4b. Referring to FIG. 4a, alignment marks labeled "B" are aligned with each other to place the outboard panel portion 224 and the center panel portion 220 in the positions shown in FIG. 4b. This positions an upper edge portion 264 of the outboard panel portion 224 overlying an upper edge portion 266 of the center panel 220, thus creating an overlap 268 where the interconnection 216 (stitching, etc.) between the outboard panel portion and center panel portion can be formed. This also positions a lower edge portion 270 of the outboard panel portion 224 overlying a lower edge portion 272 of the center panel 220, thus creating an overlap 274 where the interconnection 216 between the outboard panel portion and center panel portion can be formed.

With the front panel 212 folded to the condition illustrated in FIG. 4b, the connection 216 is applied to maintain the pleated portion 210 in the illustrated pleated condition. As shown in FIG. 4b, the connection 216 includes a first inboard connection 280 that has a first segment 282 extending along the overlap 248, thereby connecting the inboard panel portion 222 to the center panel portion 220. The first inboard connection 280 also includes a second segment 284 that connects the inboard pleat portion 230 to the center panel portion 220. A second inboard connection 290 has a first segment 292 extending along the overlap 254, thereby connecting the inboard panel portion 222 to the center panel portion 220. The second inboard connection 290 also includes a second segment 294 that connects the inboard pleat portion 230 to the center panel portion 220. The first and second inboard connections 280 and 290 help define an inboard pleat 296 of the pleated portion 210.

The connection 216 also includes a first outboard connection 300 that has a first segment 302 portion extending along the overlap 268, thereby connecting the outboard panel portion 224 to the center panel portion 220. The first outboard connection 300 also includes a second segment 304 that connects the outboard pleat portion 232 to the center panel portion 220. A second outboard connection 310 has a first segment 312 extending along the overlap 274, thereby connecting the outboard panel portion 222 to the center panel portion 220. The second outboard connection 310 also includes a second segment 314 that connects the outboard pleat portion 230 to the center panel portion 220. The first and second outboard connections 300 and 310 help define an outboard pleat 316 of the pleated portion 210.

From the above, those skilled in the art will appreciate that the inboard pleat 296 and outboard pleat 316 comprise portions of the front panel 212 that are folded over onto themselves, forming a Z-fold (see FIG. 3b), and interconnected along opposite ends of the fold. More specifically, portions of the center panel portion 220, inboard panel portion 222, and inboard pleat portion 230 are folded over onto themselves and interconnected along opposite ends of the resulting Z-fold. Similarly, portions of the center panel portion, outboard panel portion 222, and outboard pleat portion 232 are folded over onto itself and interconnected along opposite ends of the resulting Z-fold. Additionally, the pleats 296 and 316 multiple folds, that create a multiple Z-fold or accordion style pleat.

The length of the cutout portions 226, 228, 236, and 238 as viewed vertically in FIG. 4a determine the length of the pleats 296 and 316. The width of the cutout portions 226, 228, 236, and 238 as viewed horizontally in FIG. 4a determine the width or depth of the pleats 296 and 316. Although the pleated portions 230 and 232 are illustrated as being folded twice to form the Z-fold configuration of the pleats, the pleated portions could include a greater number of folds to form the pleats 296 and 316. The widths of the cutout portions 226, 228, 236, and 238 determine the width of the pleat portions 230 and 232 and thereby also determine the number of folds that can be formed in the pleat portions.

Figure 5:
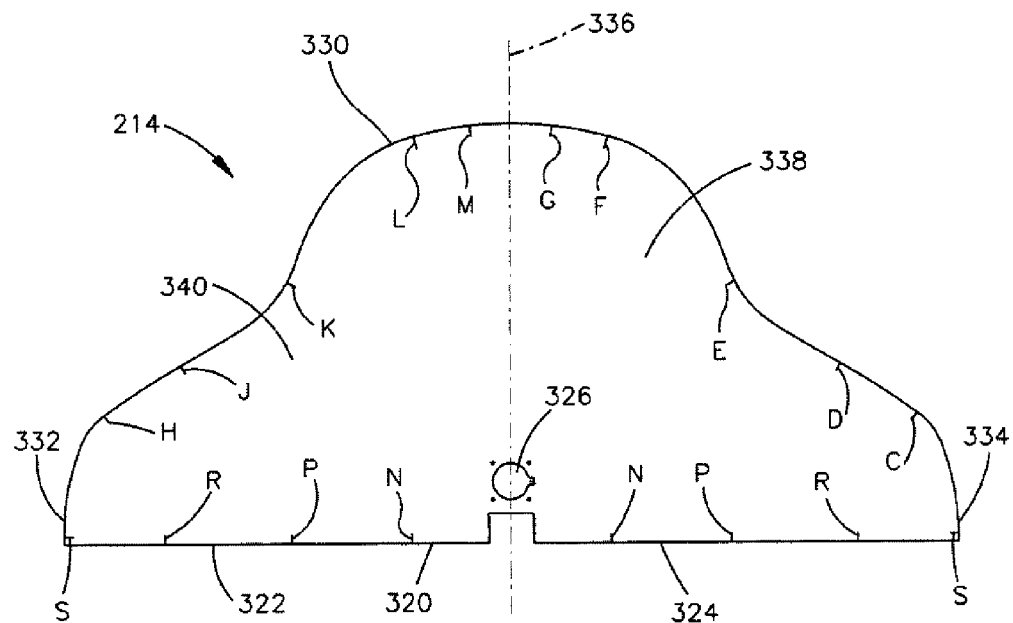
FIG. 5 is a plan view illustrating a second component part of the pleated air bag of FIGS. 1-3.

The rear panel 214 is illustrated in FIG. 5. Referring to FIG. 5, the rear panel includes a lower edge portion 320 with an inboard portion 322 and an outboard portion 324 positioned on opposite sides of an inflator opening 326. An upper edge 330 has a curved, generally bell-shaped configuration with a first end portion 332 that intersects a terminal end of the inboard portion 322 and an opposite second end portion 334 that intersects a terminal end of the outboard portion 324. The rear panel 214 is symmetrical with respect to an axis 336 of symmetry. The upper edge 330 and lower edge 320 are therefore also symmetrical with respect to this axis 336. The axis 336 helps define an outboard portion 338 of the rear panel 214 and an inboard portion 340 of the rear panel.

The front panel 212, and rear panel 214 are interconnected to construct the air bag 14. To prepare the rear panel 214 for this connection, the rear panel 214 is bent or folded generally about the axis 336 to position alignment marks N, P, R, and S on the lower edge portions 322 and 324 in alignment with each other. This brings the corresponding symmetrical portions of the inboard and outboard lower edge portions 322 and 324 into overlying engagement with each other. The aligned edge portions 322 and 324 are then interconnected by means (not shown) such as stitching, ultrasonic welding, heat bonding, or adhesives. In this configuration, the first and second end portions 332 and 334 are maintained in engagement or close proximity with each other. With the lower edge portions 322 and 324 interconnected, the rear panel 214 assumes a generally cone-shaped configuration in which the upper edge 330 forms a continuous or substantially continuous loop.

The front panel 212, which is folded and interconnected as described above to define the pleats 296 and 316 (see FIG. 4b), is connected to the rear panel 214, which is folded and interconnected as described above to assume the generally conical configuration. To align the front and rear panels 212 and 214, alignment mark S on the front panel 212 is aligned with the already aligned S marks on the rear panel 214. Alignment marks C, D, E, F, and G on the front panel 212 are aligned with the corresponding marks on the rear panel 214, which aligns the outboard portion 338 of the rear panel with the outboard portion 224 of the front panel 212. Alignment marks H, J, K, L, and M on the front panel 212 are aligned with the corresponding marks on the rear panel 214, which aligns the inboard portion 340 of the rear panel with the inboard portion 222 of the front panel 212. The front and rear panels 212 and 214, being aligned via the alignment marks, are then interconnected via the interconnections 216 (see FIG. 2) to complete construction of the air bag 14.

According to the present invention, the pleated portion 200 of the air bag 14 provides an area of the air bag that is softer than surrounding areas of the bag. Advantageously, the air bag 14 can be tailored to position the soft area of the pleated portion 200 at a desired location on the air bag by tailoring the position and orientation of the pleats 296 and 316. In the illustrated embodiment, the pleats 296 and 316 are positioned oriented to place the pleated portion 200 in a position for receiving the head and upper thorax/chest of the occupant 24 (see FIG. 1).

Testing has shown that, in an impact with an inflatable vehicle occupant protection device such as an air bag, the forces the air bag imparts on the impacting object, i.e., the occupant and particularly the occupant's head, are determined primarily by two factors: the gas pressure in the air bag and the pull force applied to the impacting object by the air bag fabric. These two forces are the primary forces acting to absorb impact forces with the air bag, in other words:

$$F_{Impact\ absorbing} = F_{Air\ bag\ pressure} + F_{Fabric\ pull}$$

Figure 6:
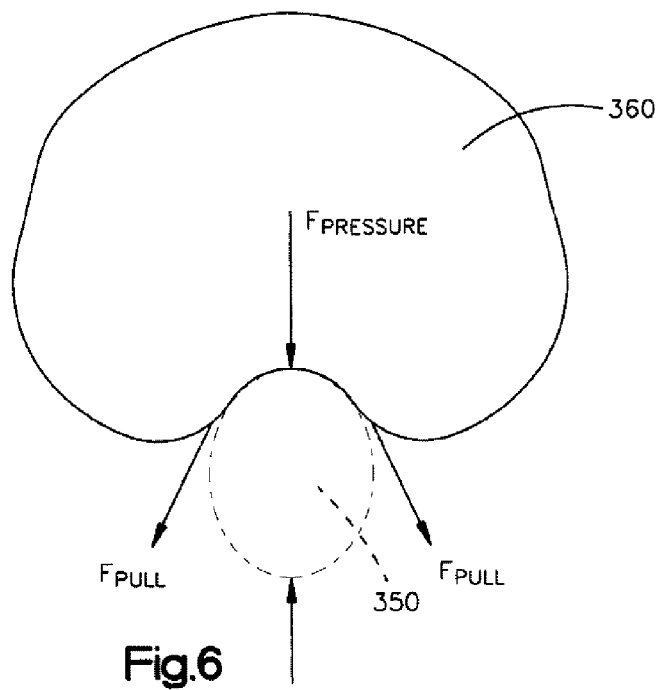
FIG. 6 is a schematic illustration of the operation of the pleated air bag of FIGS. 1-5.

This relationship is illustrated schematically in FIG. 6. Referring to FIG. 6, an impacting object 350 impacts an inflatable protection device 360, i.e., an air bag, in an impacting direction indicated generally by arrow 352 in FIG. 6. When this occurs, the force of pressure $F_{Press}$ in the air bag 350 acts in opposition to penetration of the object 360 into the air bag and thus imparts an impact absorbing force to the object. Additionally, the force of air bag fabric pull $F_{Pull}$ also acts in opposition to penetration of the object into the air bag and thus imparts an impact absorbing force to the object. Testing has also shown that the fabric pull force $F_{Pull}$ can have a significant impact on the impact absorbing characteristics of the air bag 360.

The fabric pull force $F_{Pull}$ is determined by the tension in the fabric at the location where the impacting object 350 impacts the air bag 360. The higher the fabric tension, the higher the fabric pull force $F_{Pull}$ and vice versa. As the impacting object 350 penetrates deeper into the air bag 360, the fabric tension increases and, as a result, the fabric pull force $F_{Pull}$ increases.

The fabric tension is a function of the gas pressure in the air bag and the configuration of the air bag. According to the present invention, the pleats 296 and 316 are configured and arranged to reduce the fabric tension of the pleated portion 210 of the air bag 14. The pleats 296 and 316 folded into the pleated portion 210 create slackened areas in the air bag fabric that have tension far less than other areas of the inflated air bag 14. These areas of slack abut and help define the bounds of the pleated portion 210 and therefore create an area of comparatively low fabric tension in the pleated portion. The slackened pleats 296 and 316 can be taken up as the impacting object penetrates into the inflated air bag 14, which reduces the degree to which further penetration results in increased fabric tension and fabric pull force $F_{Pull}$. As a result, the comparatively soft area of the pleated portion 210 can absorb impact forces with the occupants head and chest/thorax.

Meanwhile, the remaining areas of the central portion 200, the inboard lateral portion 202, and outboard lateral portion 204, maintain a comparatively high fabric tension. This, in combination with the gas pressure in the air bag 14, which is essentially uniformly distributed, causes the remaining areas of the central portion 200, the inboard lateral portion 202, and outboard lateral portion 204 to absorb impacts with portions of the occupant outside the pleated portion 210 with a comparatively high impact absorbing force. The pleated portion 210 thus provides comparatively soft, cushioned impact absorption for the head and upper chest/thorax of the vehicle occupant, leaving the remaining portions of the air bag 14 to perform more aggressive impact absorbing performance.

From the above, those skilled in the art will appreciate that the pleated portion 210 produces the comparatively soft configuration of the central portion 200. The pleats 296 and 316 reduce the fabric tension in the pleated portion, even when the air bag 14 is fully inflated and pressurized. Due to the folded configuration of the pleats 296 and 316, tension in the fabric of the central portion 200 is reduced in directions generally transverse or perpendicular to the pleats. At the same time, because of the spaced, opposed configuration of the connections 216 forming the pleats 296 and 316, vertical tension in the central portion 200 can be maintained. The degree to which the vertical tension in the central portion is maintained is determined at least partially by the spacing and configuration of the connections 216.

In particular, the length of the connection segments 284, 294, 304, and 314 and their proximity, i.e., the space between their respective ends, help determine the vertical tension in the central portion 200. This also helps determine the degree to which the central portion 200 bulges out from the remainder of the front panel 212 of the air bag 14. Generally speaking, close together the spacing of the respective connection pairs 280 & 300 and 290 & 310 results in a reduced degree of bulging. Conversely, spacing the respective connection pairs 280 & 300 and 290 & 310 farther apart results in an increased degree of bulging. The connections 280, 290, 300, and 310 help maintain substantially the Z-folded configuration of the pleats 296 and 316 throughout inflation and deployment and thus help maintain cushioning effects of the central portion 200 while in the inflated and deployed condition. The vertical length of the pleats 296 and 316, and thus the vertical spacing of the connections 280, 290, 300, 310 also affects the degree of bulging and the vertical tension in the central portion 200.

From the above description of the invention, those skilled in the art will perceive improvements, changes and modifications. Such improvements, changes and modifications within the skill of the art are intended to be covered by the appended claims.

Having described the invention, the following is claimed:

1. An inflatable vehicle occupant protection device comprising:
    at least one panel of material that defines an inflatable volume of the protection device, the at least one panel having a central portion presented toward the vehicle occupant in a normally inflated and deployed condition of the protection device;
    at least one pleat formed in the central portion, the at least one pleat defining a cushioned portion of the central portion that is positioned and oriented toward the occupant for receiving at least one of a head, upper thorax, and chest of the occupant in the normally inflated and deployed condition of the protection device, the at least one pleat reducing fabric tension in the cushioned portion to provide the cushioned portion with a degree of softness that is increased over remaining areas of the protection device.

2. The protection device recited in claim 1, wherein the at least one pleat relieves tension on the material of the cushioned portion in a direction generally perpendicular to the direction in which the at least one pleat extends.

3. The protection device recited in claim 1, wherein the at least one pleat comprises a pair of spaced pleats, the cushioned portion of the at least one panel being at least partially defined between the spaced pleats.

4. The protection device recited in claim 3, wherein the spaced pleats relieve tension on the material of the cushioned portion in directions extending between the spaced pleats.

5. The protection device recited in claim 3, wherein the spaced pleats do not restrict tension on the material of the cushioned portion in the direction in which the pleats extend.

6. The protection device recited in claim 1, wherein the at least one panel comprises cutout portions that extend inward from opposite edge portions of the panel, the at least one panel further comprising pleat portions defined between the cutout portions.

7. The protection device recited in claim 6, wherein the pleat portions are folded to define the at least one pleat, the protection device further comprising interconnections that secure the folded pleat portions to remaining portions of the at least one panel and thereby close the cutout portions.

8. The protection device recited in claim 7, wherein the interconnections comprise portions that interconnect overlying portions of the at least one panel that extend along the cutout portions from the pleats to the opposite edge portions of the panel.

9. The protection device recited in claim 6, wherein the cutout portions have a width that determines the width of the pleat portions and thereby determines the depth of the at least one pleat.

10. The protection device recited in claim 6, wherein the cutout portions have a length that determines the length of the pleat portions and thereby determines the length of the at least one pleat.

11. The protection device recited in claim 1, wherein the at least one pleat comprises spaced pleats that extend generally parallel to each other and in generally vertical directions, the cushioned portion being defined between the spaced pleats, the pleats reducing tension in the panel material of the cushioned portion in generally horizontal directions.

12. The protection device recited in claim 1, wherein the at least one pleat comprises folds in the at least one panel that are maintained substantially when the protection device is fully inflated and deployed.

13. The protection device recited in claim 1, wherein the at least one panel is folded over in a Z-fold configuration in the area of the at least one pleat portion to position the at least one pleat portion between overlying portions of the at least one panel.

14. An inflatable vehicle occupant protection device comprising:
   at least one panel of material that defines an inflatable volume of the protection device, the protection device having a cushioned portion positioned and oriented toward a vehicle occupant for receiving a portion of the occupant in a normally inflated and deployed condition of the protection device;
   at least one pair of cutout portions that extend toward each other from opposite edges of the at least one panel, at least one pleat portion of the at least one panel being defined between the cutout portions;
   the at least one panel being folded over in a Z-fold configuration in the area of the at least one pleat portion to position the at least one pleat portion between overlying portions of the at least one panel; and
   interconnections that interconnect the overlying portions of the at least one panel with each other and that connect the at least one pleat portion to the at least one panel to form at least one pleat that helps define the cushioned portion of the protection device.

15. The protection device recited in claim 14, wherein the interconnections maintain substantially the Z-fold configuration of the at least one pleat when the protection device is fully inflated and deployed.

16. An inflatable vehicle occupant protection device comprising:
   at least one panel of material that defines an inflatable volume of the protection device, the protection device having a cushioned portion presented toward the vehicle occupant when in an inflated and deployed condition;
   at least one pair of cutout portions that extend toward each other from opposite edges of the at least one panel, at least one pleat portion of the at least one panel being defined between the cutout portions;
   the at least one panel being folded over in a Z-fold configuration in the area of the at least one pleat portion to position the at least one pleat portion between overlying portions of the at least one panel; and
   interconnections that interconnect the overlying portions of the at least one panel with each other and that connect the at least one pleat portion to the at least one panel to form at least one pleat that helps define the cushioned portion of the protection device,
   wherein at least one pair of cutout portions comprises two pairs of cutout portions that define a spaced pair of pleated portions, the at least one panel being folded over and interconnected by the interconnections to form a spaced pair of pleats of the protection device, the cushioned portion being defined between the spaced pair of pleats.

17. The protection device recited in claim 16, wherein the spaced pair of pleats helps reduce tension in the at least one panel in the area of the cushioned portion.

18. The protection device recited in claim 16, wherein the spaced pair of pleats helps reduce tension in the cushioned portion in directions transverse to the pleats.

* * * * *